United States Patent Office 3,392,136
Patented July 9, 1968

3,392,136
FIRE RETARDANT HALOGEN-CONTAINING VINYL POLYMER CONTAINING PERHALOPENTACYCLODECANES
Raymond R. Hindersinn, Lewiston, and Harry W. Marciniak, Tonawanda, N.Y., assignors to Hooker Chemical Corporation, Niagara Falls, N.Y., a corporation of New York
No Drawing. Filed Nov. 24, 1965, Ser. No. 509,605
10 Claims. (Cl. 260—31.8)

ABSTRACT OF THE DISCLOSURE

An improved fire retardant halogen-containing vinyl polymer composition comprising (1) a halogen-containing vinyl polymer, (2) a normally combustible modifier comprising a plasticizer, and (3) between about one part and about 50 parts per 100 parts of modifier of a halogenated organic compound selected from the group consisting of perhalopentacyclodecanes of the formula $C_{10}Cl_nBr_{12-n}$, where $n$ may be up to 12, and compounds of the formula

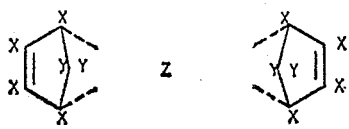

where X is selected from the group consisting of bromine, chlorine and fluorine, Y is selected from the group consisting of bromine, chlorine, fluorine, alkyl and alkoxy and Z is a cyclic hydocarbon radical having at least 5 carbon atoms and being tetravalent at four separate cyclic carbon atoms thereof.

---

This invention relates to halogen-containing vinyl polymer compositions having improved fire retardant properties.

Halogen-containing vinyl polymers often exhibit some fire retardant properties. For example, pure polyvinyl chloride is normally self-extinguishing after contact with flame. However, to achieve desirable properties in such polymers, for example, flexibility, it is common practice to incorporate into the polymer, various modifiers such as stabilizers, extenders, plasticizers, fillers, and the like. Of the various types of modifiers which may be employed, the greatest variations in properties result from the additions of plasticizers. Typical plasticizers for such halogen-containing vinyl polymers include phosphoric acid esters, such as triscresyl phosphate, and carboxylic acid esters, such as dioctyl phthalate. The phosphoric acid esters are normally noncombustible and thus may be employed without deleterious effect on the fire retardance of the polymers. For various reasons, however, these plasticizers have not been found as satisfactory as the carboxylic acid esters. The phosphoric acid esters may have an adverse effect on the thermal stability of the polymer and are generally more expensive than the carboxylic acid esters. The carboxylic acid esters, while more desirable in most respects, are normally combustible and thus deleterious to the fire retardant properties of the polymer.

It is an object of the present invention to provide polymeric compositions comprising a halogen-containing vinyl polymer and a normally combustible modifier and possessing excellent fire retardant properties.

In accordance with the present invention there is provided a fire retardant polymeric composition comprising (1) a halogen-containing vinyl polymer; (2) a normally combustible modifier; and (3) a halogenated organic fire retardant selected from the group consisting of perhalopentacyclodecanes of the formula $C_{10}Cl_nBr_{12-n}$ where $n$ may be up to 12, and compounds of the formula:

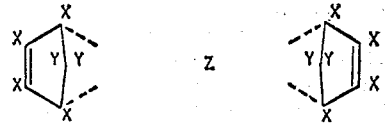

wherein X is selected from the group consisting of bromine, chlorine and fluorine, Y is selected from the group consisting of bromine, chlorine, fluorine, alkyl and alkoxy and Z is a cyclic hydrocarbon radical having at least 5 carbon atoms, and being tetravalent at four separate cyclic carbon atoms thereof.

The fire retardant properties of such polymeric compositions may be further improved by the addition of a compound of antimony, arsenic or bismuth. In general, by the addition of a compound of antimony, arsenic or bismuth, smaller amounts of the halogenated organic constituent may be employed to achieve comparable fire retardant properties.

The aforementioned perhalopentacyclodecanes are box dimers of hexahalocyclopentadiene, characterized by the structural formula

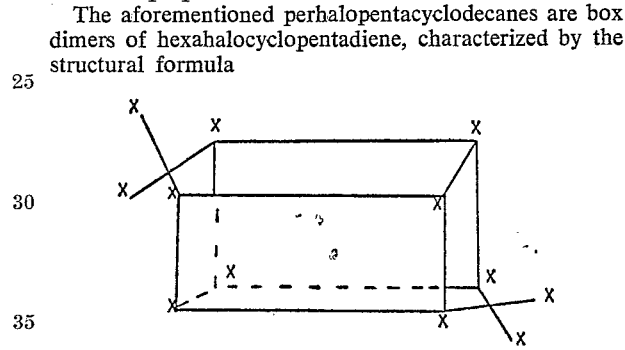

where X is chlorine or bromine. Perchloropentacyclodecane, $C_{10}Cl_{12}$, has a melting range of 483 to 487 degrees centigrade and may be prepared by the condensation of hexahalocyclopentadiene in the presence of aluminum chloride. Details of the preparation of the compound are disclosed in U.S. Patent No. 2,996,553. Other perhalopentacyclodecanes characterized by the formula $C_{10}Cl_nBr_{12-n}$ where $n$ is up to 11 may be prepared by contacting, mixing and reacting hexachlorocyclopentadiene and bromine in the presence of a catalytic amount of aluminum halide until the desired product result is formed. The reaction is described in detail in U.S. patent application S.N. 325,488, filed Nov. 1, 1963, now U.S. 3,313,857. Illustrative examples of such compounds are $C_{10}Cl_{11}Br$, $C_{10}Cl_{10}Br_2$, $C_{10}Cl_9Br_3$, $C_{10}Cl_8Br_4$ and the like. Preferred perhalopentacyclodecanes are those characterized fby the formula $C_{10}Cl_nBr_{12-n}$ where $n$ is 8 to 12 and the most preferred is $C_{10}Cl_{12}$.

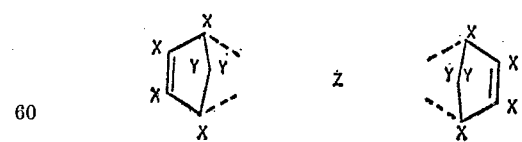

where X is bromine, chlorine or fluorine, Y is bromine, chlorine, fluorine, alkyl or alkoxy, and Z is a tetravalent cyclic hydrocarbon radical wherein the four valences are on ring carbon atoms, when the Y constituents are alkyl or alkoxy they may contain, for example, from 1 to 10 carbon atoms and preferably from 1 to 6 carbon atoms. The Z constituent will genererally have 5 to 18 carbon atoms and 1 to 5 cyclic structures and may contain substituents such as lower alkyl of 1 to 6 carbon atoms, chlorine, bromine or fluorine. When Z represents a plurality of cyclic structures, the cyclic structures are fused, that is, they share carbon atoms. The compounds contain at least 5 cyclic moieties (when Z is a single cyclic structure) and as many as 9 cyclic moieties (where Z is a plurality of cyclic structure). The compounds may be prepared by adducting (Diels-Alder reaction) one mole of a polyunsaturated cycloaliphatic compound and two or more moles of a polyhalogenated cyclopentadiene of the formula

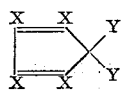

where X and Y are defined the same as above. The polyunsaturated cycloaliphatic compound mentioned above contains 5 to 18 carbon atoms, has 1 to 5 cyclic structures and when more than one, the cyclic structures are fused, and at least two sites of carbon to carbon unsaturation which may be either ethylenic or acetylenic. A detailed description of the preparation of compounds of this type is disclosed in copending application S.N. 390,220, filed Aug. 17, 1964, now abandoned and refiled as S.N. 625,594, filed March 24, 1967.

Illustrative of the polyhalogenated cyclopentadienes suitable for preparation of the aforementioned compounds are hexachlorocyclopentadiene, 5,5-dimethoxytetrachlorocyclopentadiene, hexabromocyclopentadiene, 5,5-difluorotetrachlorocyclopentadiene, 5,5-dibromotetrachlorocyclopentadiene and 5,5-diethoxytetrachlorocyclopentadiene.

Satisfactory polyunsaturated cycloaliphatic compounds for use in preparing the Diels-Alder adduct with the polyhalogenated cyclopentadiene include cycloaliphatic compounds exemplified by but not limited to methyl cyclopentadiene, cyclopentadiene, dicyclopentadiene, bicyclo-(2.2.1)heptadiene, 1,5-cyclooctadiene, cyclodecadiene and cyclododecatriene.

The preparation of 1,4,7,10-dimethanocycloocta-1,2,3, 4,7,8,9,10,13,13,14,14 - dodecachloro - 1,4,4a,5,6,6a,7,10, 10a,11,12,12a-dodecahydro[1,2,5,6]dibenzene is diclosed by Ziegler and Froitzheim-Kuhlhorn, Annalen, 1959, 589, 157. The compound has the structure:

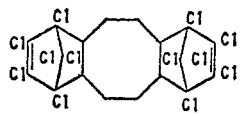

For convenience this compound will be referred to by the short title of 1,5-COD. The adduct may be prepared by condensing two moles of hexachlorocyclopentadiene with one mole of 1,5-cyclooctadiene in xylene at a temperature below 200 degrees centigrade. The adduct melts at above 350 degrees centigrade and has a vapor pressure of 0.006 millimeter of mercury at 197 degrees centigrade.

In a similar manner 1,2,3,4,6,7,8,9,13,13,14,14-dodecachloro-1,4:5, 10:6,9-trimethano-11 H-benzo[b]fluorene may be prepared by condensing two moles of hexachlorocyclopentadiene with one mole of dicyclopentadiene. The adduct has the structure:

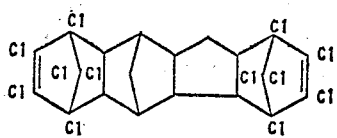

For convenience this compound will be referred to as DCP. DCP melts at about 277 degrees centigrade to 278 degrees centigrade and has a vapor pressure of 0.044 millimeter of mercury at 197 degrees centigrade.

The adduct 1,2,3,4,5,6,8,10,10,11,11 - dodecachloro-1,4:5,8-dimethanofluorene is prepared by condensing two moles of hexachlorocyclopentadiene with one mole of cyclopentadiene. This adduct has the structure:

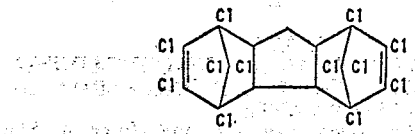

For convenience this adduct will be referred to as CP. CP melts at about 319 degrees centigrade to 322 degrees centigrade and has a vapor pressure of 0.031 millimeter of mercury at 197 degrees centigrade.

The adduct 1,2,3,4,5,6,7,8,12,12,13,13 - dodecachloro-1,4:5,8:9,10-trimethano-anthracene is prepared by condensing one mole of the Diels-Alder adduct of cyclopentadiene and acetylene with two moles of hexachlorocyclopentadiene. The resulting adduct has the structure:

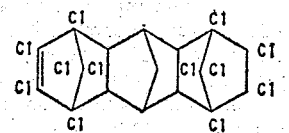

For convenience this adduct will be referred to as BCH. BCH melts at amout 340 degrees centigrade and has a vapor pressure of 0.008 millimeter of mercury at 197 degrees centigrade.

In a similar manner, various other compounds of the formula

where X, Y and Z are as previously defined, which may be employed in the additive compositions of the present invention, may be prepared by a Diels-Alder adduction of a mole of a polyunsaturated cycloaliphatic compound and two or more moles of a polyhalogenated cyclopentadiene. The preferred compound is that prepared by adducting two moles of hexachlorocyclopentadiene with one mole of 1,5-cyclooctadiene, that is, the compound described above and referred to as 1,5-COD.

Of the various antimony, arsenic or bismuth compounds which may be employed in the present compositions, oxides are preferred and the most preferable is antimony trioxide. However, various other compounds of antimony, arsenic or bismuth are suitable. Suitable antimony compounds include the sulfides of antimony, alkali metal salts of antimony, antimony salts of organic acids and their pentavalent derivatives and the esters of antimonous acids and their pentavalent derivatives. It is convenient to use sodium antimonite or potassium antimonite when it is desired to use an alkali metal salt of the antimony for compositions of this invention. United States Patent 2,996,528 discloses suitable antimony salts of organic acids and their pentavalent derivatives. Compounds of this class include, for example, the trivalent antimony salts of organic acids of 3 to 12 carbon atoms, such as antimony butyrate, antimony valerate, antimony caproate, antimony heptylate, antimony caprylate, antimony pelargonate, antimony caprate, antimony cinnamate, antimony anisate, and their pentavalent dihalide derivatives. Similarly, the esters of antimonous acids and their pentavalent derivatives disclosed in United States Patent 2,993,924, such as tris(n-octyl)antimonite, tris(2-ethylhexyl)antimonite, tribenzyl antimonite, tris(beta-chloroethyl)antimonite, tris(beta - chloropropyl)antimonite, tris(beta-chlorobutyl)antimonite, and their pentavalent dihalide derivatives, may be employed. Still other suitable organic antimony compounds are the cyclic antimonites such as trimethylol propane antimonite, pentaerythritol antimonite and glycerol antimonite. The corresponding arsenic and bismuth compounds can also be employed, and in particular, the oxides of arsenic and bismuth.

Various halogen-containing vinyl polymers and copolymers may be employed in the compositions of the present invention. Typical polymers include, for example, polyvinyl chloride, polyvinyl bromide, polyvinylidene chloride, polyvinylidene fluoride, chlorinated polyethylene, and the like. Typical copolymers include, for example, copolymers of vinyl chloride-vinyl acetate, vinyl chloride-vinylidene chloride, vinyl chloride-diethyl maleate, vinyl chloride-vinyl stearate, and the like, and terpolymers of these with other monomers such as maleic anhydride, diethyl maleate, and the like.

Such polymers are compounded with various modifiers which provide the properties to enable the polymer composition to be worked into desired finished products or improve properties such as flexibility, dimensional stability, tensile strength, chemical resistance, weatherability, dielectric strength, and the like. Frequently, such modifiers are combustible materials which, while enhancing other properties of the polymer, exhibit a deleterious effect on the fire retardant properties of halogen-containing polymers. Notable offenders in this respect are the modifiers referred to as plasticizers. Such combustible modifiers are employed in the polymer compositions of the present invention with little or no deleterious effect on fire retardance. Plasticizers suitable for use in the compositions of the present invention include the alkyl and aryl esters of carboxylic acids such as phthalic, adipic, azelaic, sebacic, citric, stearic acids, and the like, and in particular the alkyl or aryl esters of dicarboxylic acids such as phthalates, adipates and sebacates wherein the alkyl or aryl group is from about 4 to 14 carbon atoms. The preferred plasticizers are the alkyl phthalates, and most preferably, the dioctyl phthalates, i.e., di(2-ethylhexyl)phthalate (commonly referred to as DOP), diisooctyl phthalate (commonly referred to as DIOP). Other normally combustible modifiers which may be employed include, for example, other phthalic anhydride esters, such as dibutyl phthalate, butylbenzyl phthalate, butyloctyl phthalate, butyldecyl phthalate, diisobutyl phthalate, dihexyl phthalate, dicyclohexyl phthalate, diisodecyl phthalate, isooctylisodecyl phthalate, n-octyl-n-decyl phthalate, ditridecyl phthalate, dicarpryl phthalate; adipic acid esters, such as di(1-ethylhexyl)adipate, diisooctyl adipate, diisobutyl adipate, didecyl adipate, diisodecyl adipate, octyl decyl adipate; azelaic acid esters, such as dioctyl azelate; sebacic acid esters, such as dioctyl sebacate, dibutyl sebacate; and others.

Of the various halogen-containing polymers and copolymers which may be employed in the compositions of the present invention, the preferred are polymers and copolymers of vinyl chloride, and most preferably, those in which the major polymer substituent is polyvinyl chloride. Polyvinyl chloride, commonly referred to as PVC, may be prepared by suspension or emulsion polymerization of monomeric vinyl chloride with the aid of a catalyst, such as an organic peroxide, at temperatures ranging from about 20 to 60 degrees centigrade. Details of the preparation of PVC and other halogen-containing polymers which may be employed in the compositions of the present invention are disclosed in Vinyl and Related Polymers by Calvin E. Schildlenecht, John Wiley & Sons, Inc., New York (1952).

The largest percentage of PVC produced is for applications where flexibility is important. The inherent rigidity of PVC is modified with the aid of a plasticizer to yield PVC compositions having improved flexibility. The popularity of flexible PVC is such that it accounts for the consumption of approximately 70 percent of all plasticizer production. Flexible polymer compositions of PVC, or of various other halogen-containing polymers may contain combustible plasticizers or other combustible modifiers in amounts ranging from 10 percent by weight or less to as high as 85 percent by weight or higher. Despite the presence of a combustible modifier, the desired fire retardant properties, i.e., self-extinguishing properties, are retained in compositions of the present invention by the addition of a halogenated organic fire retardant compound of the type described hereinabove. The amount employed will vary depending on the amount of combustible modifier employed. Satisfactory fire retardance may be imparted by the addition of the aforementioned halogenated organic compound in a proportion between about 1 and 50, and preferably between about 4 and 10 parts by weight per 100 parts of combustible modifier. If desired, the fire retardance may be further enhanced by the further addition of between about 0.5 and 25, and preferably between about 2 and 5 parts by weight of a compound of antimony, arsenic or bismuth per 100 parts of combustible modifier. Suitable compounds of antimony, arsenic or bismuth are described hereinabove.

It will be apparent that considerable variation is permissible with respect to components and amounts employed in the fire retardant polymeric compositions of the present invention. The type and amount of halogen-containing polymer and normally combustible modifiers employed will depend on the properties desired in the final product. We have found, for example, that an excellent composition having the necessary flexibility, fire retardance and other desirable properties for use as a coating on electrical wires and the like, may be prepared from 100 parts of PVC having incorporated therewith: between about 25 and 75 parts by weight of dioctyl phthalate (either di(2-ethylhexyl)phthalate or diisooctyl phthalate); between about 2 and 10 parts by weight of a fire retardant, such as the aforementioned 1,5-COD or perchloropentacyclodecane and between about 0.4 and 5 parts by weight of $Sb_2O_3$.

The modifiers, such as plasticizers, as well as the fire retardant additives, may be added to the monomer before or during polymerization or may be compounded with the polymer after polymerization. Preferably such materials are incorporated after polymerization by intimate mixing, for example, by blending on hot rolls or in a heated mixer. If desired, the fire retardant additive may be premixed with a modifier such as a plasticizer, for later incorporation in a polymer composition.

The present invention and the manner in which it may be practiced is further illustrated by the following examples. All parts are by weight and temperatures are in degrees centigrade, unless otherwise indicated.

Example 1

A mixture of 100 parts of polyvinyl chloride, 25 parts of di(2-ethylhexyl)phthalate, 10 parts of 1,5-COD and 5 parts of $Sb_2O_3$ was blended on a two roll rubber mill at 155 degrees centigrade and fabricated at the same temperature into film having a thickness of 10 mils. The polyvinyl chloride employed was a general purpose resin of the type GP 4-15343 according to the American Society for Testing and Materials designation D1755-60T. The fire retardance of the film was tested in the following manner. A strip of film 9 inches by 1 inch was vertically suspended and a flame from a Bunsen burner, burning propane gas, was applied to the strip for five seconds. The self-extinguishing time, that is, the period of time which the film strip continued to burn after removal of the flame, was noted. The film prepared as described above was found to have a self-extinguishing time of less than one second.

Following the procedure of the above example, a polymer composition having similar fire retardant properties is prepared when 10 parts of the aforementioned BCH compound is substituted for the 1,5-COD.

Examples 2-13

The procedure of Example 1 was repeated except that the compositions were varied as shown and the self-extinguishing time of the various compositions tested is as shown.

| | Example Number | | | | | | | | | | |
|---|---|---|---|---|---|---|---|---|---|---|---|
| | 2 | 3 | 4 | 5 | 6 | 7 | 8 | 9 | 10 | 11 | 12 |
| Parts by Weight: | | | | | | | | | | | |
| Polyvinyl chloride | 100 | 100 | 100 | 100 | 100 | 100 | 100 | 100 | 100 | 100 | 100 |
| Di(2-ethylhexyl)phthalate | 50 | 50 | 50 | 50 | 50 | 50 | 25 | 75 | 75 | 75 | 75 |
| 1,5-COD | 0 | 10 | 5 | 0 | 4 | 2 | 10 | 7.6 | 6 | 5.6 | 3 |
| Perchloropentacyclodecane | 0 | 0 | 0 | 5 | 0 | 0 | 0 | 0 | 0 | 0 | 0 |
| $Sb_2O_3$ | 0 | 5 | 2 | 2 | 0.4 | 1 | 2 | 3 | 0.6 | 3 | 1.6 |
| Self-extinguishing time (seconds) | (1) | 0 | 1 | 2.3 | 3 | 5 | 0 | 2 | 1 | <1 | 1.5 |

[1] Not Self-extinguishing.

Polymeric compositions having fire retardant properties similar to those shown hereinabove are prepared when in the above examples, other halogen-containing polymers, such as polyvinylidene chloride, or copolymers, such as vinyl chloride-vinyl acetate copolymers, are substituted for PVC.

Similar fire retardant polymeric compositions may be prepared when other normally combustible modifiers such as diisooctyl phthalate, diisodecyl phthalate, diisodecyl adipate, or dioctyl sebecate are employed in place of the di(2-ethylhexyl)phthalate in the above examples.

It will be apparent to those skilled in the art that many variations and modifications of the invention as hereinabove set forth may be made without departing from the spirit and scope of the invention. The invention is not to be construed as being limited only to the examples given.

What is claimed is:

1. A fire retardant halogen-containing vinyl polymer composition comprising (1) a halogen-containing vinyl polymer, (2) a normally combustible modifier comprising a plasticizer and (3) between about one part and about 50 parts per 100 parts of modifier of a halogenated organic compound selected from the group consisting of perhalopentacyclodecanes of the formula $C_{10}Cl_nBr_{12-n}$, where $n$ may be up to 12, and compounds of the formula

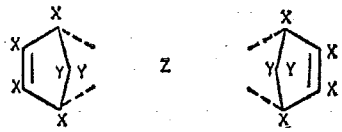

where X is selected from the group consisting of bromine, chlorine and fluorine, Y is selected from the group consisting of bromine, chlorine, fluorine, alkyl and alkoxy and Z is a cyclic hydrocarbon radical having at least 5 carbon atoms and being tetravalent at four separate cyclic carbon atoms thereof.

2. A fire retardant polymeric composition according to claim 1 wherein said halogenated organic compound is a perhalocyclopentadecane of the formula $C_{10}Cl_nBr_{12-n}$.

3. A fire retardant polymeric composition according to claim 1 in which the halogenated organic compound is perchloropentacyclodecane and the polymer is polyvinyl chloride and which contains a compound of an element selected from the group consisting of antimony, arsenic and bismuth.

4. A fire retardant polymeric composition according to claim 3, wherein the normally combustible modifier is an alkyl ester of phthalic anhydride and the compound is $Sb_2O_3$.

5. A fire retardant polymeric composition according to claim 4 comprising, in parts by weight, between about 50 and 1 parts of perchloropentacyclodecane, and between about 25 and 0.5 parts of $Sb_2O_3$ per 100 parts of said normally combustible modifier.

6. A fire retardant polymeric composition according to claim 1 wherein said halogenated organic compound is characterized by the formula

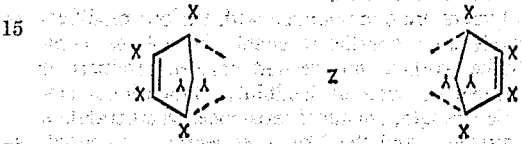

wherein X is selected from the group consisting of bromine, chlorine and fluorine, Y is selected from the group consisting of bromine, chlorine, fluorine, alkyl and alkoxy and Z is a cyclic hydrocarbon radical of 5 to 18 carbon carbon atoms, and being tetravalent at four separate carbon atoms thereof.

7. A fire retardant polymeric composition according to claim 1 in which the halogenated organic compound is

and the polymer is polyvinyl chloride and which contains a compound of an element selected from the group consisting of antimony, arsenic and bismuth.

8. A fire retardant polymeric composition according to claim 7 wherein the normally combustible modifier is an alkyl ester of phthalic anhydride and the compound is $Sb_2O_3$.

9. A fire retardant polymeric composition according to claim 8 comprising, in parts by weight, between about 50 and 1 parts of said halogenated organic compound and between about 25 and 0.5 parts of $Sb_2O_3$ per 100 parts of said normally combustible modifier.

10. A fire retardant polymeric composition according to claim 1 comprising, in parts by weight: 100 parts of polyvinyl chloride; between about 25 and 75 parts of di(2-ethylhexyl)phthalate; between about 2 and 10 parts of a halogenated organic compound selected from the group consisting of perchloropentacyclodecane and the compound of the formula

and between about 0.4 and 5.0 parts of $Sb_2O_3$.

References Cited

UNITED STATES PATENTS 2,635,977   4/1953   Lidov _____ 260—648
3,158,588   11/1964  Johnson _____ 260—45.7
3,313,857   4/1967   Gelfand _____ 260—468

MORRIS LIEBMAN, *Primary Examiner.*

L. T. JACOBS, *Assistant Examiner.*